United States Patent Office 3,558,689
Patented Jan. 26, 1971

3,558,689
ALPHA-(HYDROXY OR ACYLOXY-4,7-METHANO-INDENYL) ESTERS AND ACIDS
Morris Dunkel, Paramus, N.J., assignor to Universal Oil Products Company, Des Plaines, Ill., a corporation of Delaware
No Drawing. Filed Feb. 23, 1967, Ser. No. 617,865
Int. Cl. C07c 61/32, 69/74
U.S. Cl. 260—468                             11 Claims

ABSTRACT OF THE DISCLOSURE

Novel alpha-(hydroxy or acyloxy 4,7-methano-indenyl) esters or acids useful as perfume ingredients prepared basically by a Reformatsky-type reaction of corresponding methanoindenones with α-haloesters.

---

This invention relates to a new class of compounds, to the preparational process therefor and to perfume compositions containing such compounds as olfactory ingredients. More particularly, this invention relates to novel disubstituted 4,7-methanoindenes.

The novel 4,7-methanoindene derivatives of this invention may be represented by the following structural formulae:

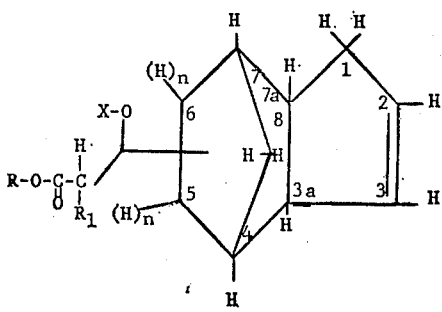

and                                           (I)

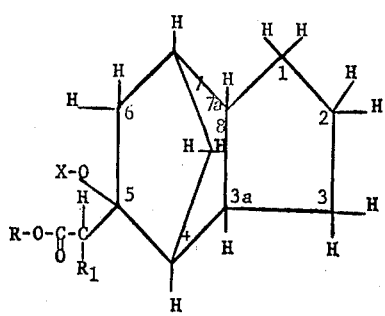

(II)

where X is selected from the group consisting of hydrogen and acyl, R and $R_1$, independently of each other, are selected from the group consisting of hydrogen, alkyl and alkenyl and where $n$ is an integer of 0 or 2; provided, that for the carbon atom in the 5 or 6 position which is disubstituted with the substituents X—O— and

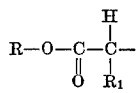

the integer associated therewith is 0 and the other integer is 2. Because of the existence of the double bond in the hexahydromethanoindene of this invention illustrated by structure I above, the positions 5 and 6 are not chemically equivalent, and accordingly, when the hexahydromethanoindene is substituted with the two substituents according to this invention, different isomeric compounds result depending upon whether the substituents are on the 5 or 6 positioned carbon atom. The extremely close physical similarity of such isomeric compounds moreover, prevents ready identification and separation of the different isomers from each other and for this reason it is intended that both isomeric compounds as well as mixtures thereof be encompassed within this invention by describing the hexahydromethanoindene in this specification and appended claims as hexahydromethanoindene disubstituted in one of the 5 and 6 positions with the two substituents. No comparable problem exists for the octahydromethanoindene of this invention illustrated by structure II above, inasmuch as there is no double bond in the cyclopentane portion of the molecule and the positions 5 and 6 are accordingly chemically equivalent. For this reason, the octahydromethanoindene is described in this specification and appended claims as being substituted with the two substituents in the 5 position. Both the hexahydro- and octahydromethanoindenes of this invention also exist in the exo and endo forms and it is intended that all of these isomeric compounds be encompassed within this invention.

The novel 4,7-methanoindenes of this invention find wide utility in the chemical field and are especially useful as plasticizers, ingredients of synthetic waxes and resins, perfume materials or as intermediates for drugs and insecticides. Of these many used, however, one of the more valuable present uses for these compounds is in perfumery due to their highly pleasant, odorous nature. Significant in this respect is that certain of these compounds, and particularly the ester compounds, that is where R of structures I or II above is alkyl or alkenyl, have desirable odor properties. For example, ethyl, α-(5-hydroxy-2,3,3a,4,5,6,7,7a - octahydro-4,7-methanoinden-5-yl) acetate has a light, apple blossom odor which has wide and valuable application in perfumery.

Accordingly, it is an object of this invention to provide a new class of compounds consisting of 4,7-methanoindenes having two specific substituents at one of the 5 and 6 positions. Another object is to provide a preparational process for these disubstituted 4,7-methanoindenes. Still another object of this invention is to provide perfume composition containing these novel disubstituted 4,7-methanoindenes as olfactory ingredients. Other objects of this invention will become apparent from the following further detailed description thereof.

The methanoindenes of this invention may be prepared, in general, by first preparing the hydroxyester derivatives, that is, the compounds represented by structures I and II above where R is alkyl or alkenyl and X is hydrogen by reacting an alpha halo ester with a corresponding methanoindenone under Reformatsky conditions. The acyloxy-ester derivatives, that is, the compounds represented by structures I and II above where R is alkyl or alkenyl and X is acyl may then, in general, be prepared by acylating the hydroxy-ester derivatives. The acid derivatives, that is, the compounds represented by structures I or II above where R is hydrogen may then, in general, be prepared by hydrolyzing or saponifying the corresponding ester derivatives.

The addition of an alpha halo ester to a methanoindenone under Reformatsky conditions to form the methanoindene ester derivatives of this invention represented by structures I and II above where X is hydrogen and R is alkyl or alkenyl may be represented by the following equation where an octahydromethanoindene ester derivative is prepared.

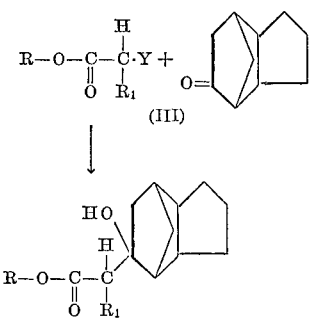

The preparation of the hexahydromethanoindene ester derivative will proceed according to the same reaction with the only difference being that instead of using an octahydromethanoindenone as the reactant, a hexahydromethanoindenone will be used where the oxo group is in one of the 5 and 6 positions. The alpha halo ester used in the reaction is represented by structure III above where Y is halogen, preferably bromine, and R and $R_1$ have the same significance as above. When R or $R_1$ are alkyl or alkenyl, they preferably ar alkyl or alkenyl groups containing from 1 to about 5 carbon atoms. Examples of the alpha halo ester represented by structure III above include: methyl, α-bromoacetate; methyl, α-chloroacetate; ethyl, α-bromo, α-methylacetate; ethyl, α-bromo, α-ethylacetate; ethyl, α-bromo, α-isopropylacetate; allyl, α-bromo, α-methylacetate; ethyl, α-bromo, α-allylacetate; propyl, α-bromoacetate; propyl, α-bromo, α-methylacetate; butyl, α-bromoacetate; or butyl, α-bromo, α-methylacetate. The methanoindenones reacted with the α-halo acetates illustrated above may be obtained by several different preparational methods. One method involves first preparing the hexahydromethanoindenone by reacting cyclopentadiene dimer with dilute sulfuric acid to obtain the corresponding hexahydromethanoindenol which is then converted by oxidation or dehydrogenation to the desired 3a,4,5,6,7,7a - hexahydro - 4,7 - methanoindenone substituted in one of the 5 or 6 positions with the oxo group. This compound may then be hydrogenated to obtain the octahydromethanoindenone, or more specifically, 2,3,3a,4,5,6,7,7a-octahydro - 4,7 - methanonindenone substituted in the 5 position with the oxo group.

In effecting the Reformatsky-type addition of the α-halo ester to the desired methanoindenone, the conditions and procedures used may be widely varied. Generally, the addition reaction is effected by contacting the reactants in the presence of zinc metal and a solvent for a period of time sufficient to complete the addition reaction. Suitable inert solvents for the reaction include ethers or aromatics such as benzene or toluene. The zinc used in the reaction to form an organometallic zinc derivative of the α-halo ester for the addition reaction should be in a relatively pure metallic form. Accordingly, it is usually desirable to pre-clean the zinc to remove any oxides prior to the reaction in order that the zinc will be sufficiently reactive. The amount of the reactants used is not important and stoichiometric proportions of one mol of the methanoindenone per one mol of zinc and one mol of the α-halo ester usually are satisfactory. The temperature used may be varied and is dependent upon such factors as the particular reactants used and the particular reaction rate desired. Usually, however, the temperature ranges from about 20° to 80° C. for reaction periods of from 1 to 5 hours with reflux temperatures under atmospheric pressure being conveniently used. When the addition reaction is complete, the desired product may be recovered from the reaction mixture and purified by conventional methods including extraction and fractional distillation. Examples of the methanoindene ester derivatives of this invention represented by structures I and II above where X is hydrogen and R is alkyl or alkenyl include hexahydromethanoindenes such as methyl α-(5 or 6-hydroxy-3a,4,5,6,7,7a-hexahydro-4,7-methanoinden-5 or 6-yl) acetate; methyl, α-methyl, α-(5- or 6-hydroxy-3a,4,5,6,7,7a-hexahydro-4,7-methanoinden-5 or 6-yl) acetate; ethyl α-ethyl, α-(5 or 6-hydroxy-3a,4,5,6,7,7a-hexahydro-4,7-methanoinden-5 or 6-yl) acetate; propyl α-(5 or 6-hydroxy-3a,4,5,6,7,7a-hexahydro-4,7-methanoinden-5 or 6-yl) acetate; or butyl α-(5 or 6-hydroxy-3a,4,5,6,7,7a-hexahydro-4,7-methanoinden-5 or 6-yl) acetate; and octahydromethanoindenes such as methyl α-(5-hydroxy-2,3,3a, 4,5,6,7,7a-octahydro - 4,7 - methanoinden - 5 - yl) acetate; allyl, α-(5-hydroxy-2,3,3a,4,5,6,7,7a-octahydro-4,7-methanoinden-5-yl) acetate; ethyl, α-methyl, α-(5-hydroxy-2,3,3a,4,5,6,7,7a-octahydro-4,7-methanoinden - 5 - yl) acetate; butyl α-methyl α-(5-hydroxy-2,3,3a,4,5,6,7,7a-octahydro-4,7-methanoinden-5-yl) acetate.

When the methanoindene ester derivatives of this invention represented by structures I and II above where X is acyl and R is alkyl or alkenyl are desired, then the corresponding methanoindene ester derivatives of this invention where X is hydrogen, prepared as above, may be acylated by esterifying with an acyl halide or acid anhydride. The acyl halides or acid anhydrides which are used for this purpose have from 1 to about 6 carbon atoms in the acyl portion or portions of their molecules and include acetyl, propionyl, butyryl, or isocaproyl halides, for example, chlorides or the corresponding acid anhydrides thereof. The esterification reaction may be effected according to any of the standard esterification techniques. For example, the reaction may be effected by slowly adding the desired acyl halide or acid anhydride, perferably dissolved in a suitable solvent such as diethyl ether or pyridine, to the desired hydroxy methanoindenyl acetate with the temperature being maintained at about 20° C. to 50° C. A stoichiometric quantity of the acyl halide or the acid anhydride may be used although it is generally preferred to use a molar excess of the acyl halide or acid anhydride ranging up to about 20 percent or more based upon the amount of the methanoindenyl acetate reactant to insure desirable product yields. When the reaction is complete, the desired product is recovered from the reaction mixture and purified by conventional means such as extraction and distillation. Example of the methanoindene ester derivatives of this invention represented by structures I and II above where X is an acyl group and R is alkyl or alkenyl include hexahydromethanoindenes such as methyl α-(5 or 6-acetyloxy-3a,4,5,6,7, 7a-hexahydro-4,7-methanoinden-5 or 6-yl) acetate; methyl α-methyl, α-(5 or 6-propionyloxy-3a,4,5,6,7,7a-hexahydro-4,7-methanoinden-5 or 6-yl) acetate; ethyl α-(5 or 6-acetyloxy-3a,4,5,6,7,7a-hexahydro-4,7-methanoinden-5 or 6-yl) acetate; or ethyl α-methyl, α-(5 or 6-butyryloxy-3a, 4,5,6,7,7a-hexahydro-4,7-methanoinden-5 or 6-yl) acetate; and octahydromethanoindenes such as methyl α-(5-acetyloxy-2,3,3a,4,5,6,7,7a-octahydro-4,7-methanoinden-5 - yl) acetate; methyl α-ethyl, α-(5-propionyloxy-2,3,3a,4,5,6,7, 7a-octahydro-4,7-methanoinden-5-yl) acetate; ethyl α-(5-butyryloxy-2,3,3a,4,5,6,7,7a-octahydro-4,7-methanoinden-5-yl) acetate; or butyl α-methyl, α-(5-acetyloxy-2,3,3a,4, 5,6,7,7a-octahydro-4,7-methanoinden-5-yl) acetate.

When the methanoindene acid derivatives of this invention represented by structures I and II above where R is hydrogen are desired, then the corresponding methanoindene ester derivatives of this invention may be hydrolyzed or saponified to form the desired product. Conventional techniques may be used to effect this reaction. However, when methanoindene acid derivatives are prepared where X is an acyl group, suitable conventional, protective reaction conditions should be used to prevent loss of the acyl group. Examples of the methanoindene acid derivatives of this invention represented by structures I and II above where R is hydrogen, include: hexahydromethanoindenes such as α-(5 or 6-hydroxy-3a,4,5,6,7,7a-hexahydro-4,7-methanoinden-5 or 6-yl) acetic acid; or α-(5- or 6-acetyloxy-3a,4,5,6,7,7a-hexahydro-4,7-methanoinden-5 or 6-yl) acetic acid; and octahydromethanoindenes such as α-(5-hydroxy-2,3,3a,4,5,6,7,7a-octahydro-4,7-methanoinden-5-yl) acetic acid; α-(5-acetyloxy-2,3,3a,4,5,6,7,7a-octahydro-4,7-methanoinden-5-yl) acetic acid; or α-methyl, α-(5-hydroxy-2,3,3a,4,5,6,7,7a-octahydro-4,7-methanoinden-5-yl) acetic acid.

As hereinbefore indicated, the odorous nature of the novel compounds of this invention, particularly the ester derivatives, render them highly valuable as perfume ingredients. The odor and odor characteristics of the different compounds embraced within the invention differ widely, however. For example, ethyl α-(5-hydroxy-2,3,3a,4,5,6,7,7a-octahydro-4,7-methanoinden-5-yl) acetate has an odor reminiscent of ambrette seed, whereas ethyl α-methyl, α-(5-hydroxy-2,3,3a,4,5,6,7,7a-octahydro-4,7-methanoinden-5-yl) acetate has a light apple blossom odor.

The compounds of this invention, either individually or in admixture, may be used in perfumes as the olfactory ingredient thereof and thus create novel perfume compositions. As used herein, the term perfume means a mixture of synthetic or naturally derived organic compounds including, for example, alcohols, aldehydes, ethers, ketones, esters, and frequently also hydrocarbons which are combined in fixed proportions so that the odors of the individual compounds combine to produce a harmonious fragrance. In perfumery practice these compounds are combined through the blending of natural oils, gums, resins, animal derivatives, absolutes, natural isolates or synthetic chemicals. The quantity of the novel compounds of this invention utilized in perfumes as the olfactory ingredient thereof may vary within a wide range and depends upon the particular compound used and the particular type of perfume being created or improved. Typically, however, the quantity of the substituted methanoindenes used in perfumes may range from about 0.01 to 80 percent of the total weight of the perfume with a quantity of about 0.1 to 25 percent by weight being satisfactory in most instances. The perfume compositions of this invention having the disubstituted 4,7-methanoindenes as olfactory ingredients may be used per se in alcoholic solutions or incorporated into items such as cosmetic creams, soaps, synthetic detergents, talcum powders or other toilet goods such as shampoos to produce products having desirable commercial fragrance properties.

The following examples are given to illustrate the compounds of this invention, the preparational process therefor and perfume compositions containing the compounds as olfactory ingredients. These examples are not, however, intended to limit the generally broad scope of this invention in strict accordance therewith.

EXAMPLE I

Ethyl α-(5-hydroxy-2,3,3a,4,5,6,7,7a-octahydro - 4,7-methanoinden-5-yl) acetate was prepared according to the process of this invention by the following procedure:

A reaction flask containing 30 grams of zinc, which had been previously deoxidized, was charged with a solution of 70 grams of 2,3,3a,4,5,6,7,7a-octahydro-4,7-methanoinden-5-one, 77 grams of ethyl α-bromoacetate and 267 grams of tetrahydrofuran. The stirred mixture was heated with the reaction starting at about 60°. The heating was continued at reflux temperature (70° C.) for about 3 hours. The mixture was then cooled and charged to another flask containing ice. The resulting precipitated inorganic materials were redissolved by the addition of 80 grams of acetic acid and the mixture was extracted with 433 grams of toluene. The remaining aqueous layer was extracted with an additional 218 grams of toluene and the two extracts were combined, water washed and distilled to remove the solvents. The residue was fractionally distilled to recover 84 grams of product boiling at 135° to 140° C. at 4 mm. Hg and having a refractive index $n_D^{25}$ 1.4892.

EXAMPLE II

Ethyl α-methyl α-(5-hydroxy-2,3,3a,4,5,6,7,7a-octahydro-4,7-methanoinden-5-yl) acetate was prepared according to the process of this invention by the following procedure:

A reaction flask containing 30 grams of zinc, which had been previously deoxidized, was charged with 187 grams of 2,3,3a,4,5,6,7,7a-octahydro-4,7-methanoinden-5-one, 225 grams of ethyl, α-bromo, α-methylacetate and 280 grams of tetrahydrofuran. The mixture was heated with stirring with the reaction starting at about 60° C. The heating was continued at reflux temperature (70° C.) for about 3 hours. The mixture was then cooled and charged to another flask containing ice. The resulting precipitated inorganic materials were dissolved by the addition of acetic acid and the mixture was extracted with toluene. The remaining aqueous layer was extracted with additional toluene and the two extracts were combined, water washed and distilled to remove the solvents. The residue was then fractionally distilled to recover 245.5 grams of product boiling at 115° to 125° C. at 2 mm. Hg and having a refractive index $n_D^{20}$ 1.4898 to 1.4900.

EXAMPLE III

Ethyl α-(5 or 6-hydroxy-3a,4,5,6,7,7a-hexahydro-4,7-methanoinden-5 or 6-yl) acetate is prepared according to the process of this invention by the following procedure:

A reaction flask containing 30 grams of zinc, which has been previously deoxidized, is charged with a solution of 69 grams of 3a,4,5,6,7,7a-hexahydro-4,7-methanoinden-5 or 6-one, 77 grams of ethyl α-bromoacetate and 265 grams of tetrahydrofuran. The mixture is heated with stirring with the reaction starting at about 60° C. The heating is continued at reflux temperature for about 3 hours. The mixture is then cooled and charged to another flask containing ice. The resulting precipitated inorganic materials are redissolved by the addition of acetic acid and the mixture is extracted with toluene. The remaining aqueous layer is extracted again with toluene and the two extracts are combined, washed with water and distilled to remove the solvent. The residue is then fractionally distilled to recover the product.

EXAMPLE IV

Ethyl α-(5 - acetyloxy-2,3,3a,4,5,6,7,7a-octahydro-4,7-methanoinden-5-yl) acetate is prepared according to the following procedure:

About 5 grams of ethyl α-(5-hydroxy-2,3,3a,4,5,6,7,7a-octahydro-4,7-methanoinden-5-yl) acetate and 50 grams of pyridine are charged to a reaction flask equipped with stirring means. With stirring, about 5 grams of acetyl chloride are added while maintaining the temperature of the mixture at about 5° C. After the addition is complete, the stirring is continued for about 1 hour while maintaining such temperature. The mixture is allowed to stand for about 16 hours and then ice water is added. The resulting mixture is extracted with diethyl ether. After the extract is washed with water and a dilute hydrochloric acid solution, the diethyl ether solvent is removed by distillation and the reaction residue thereafter subjected to vacuum fractionation to recover the product.

EXAMPLE V

A bouquet-type perfume is prepared using a compound of this invention to induce a desired ambrette seed note by combining the following components in the indicated proportions.

| Component: | Parts by wt. |
|---|---|
| Ethyl α - (5 - hydroxy - 2,3,3a,4,5,6,7,7a - octahydro-4,7-methanoinden-5-yl) acetate | 5 |
| Lavender oil, French | 400 |
| Bergamot oil | 100 |
| Geraniol | 100 |
| Ylang-Ylang oil | 25 |
| Clary sage oil | 5 |

| Component: | Parts by wt. |
|---|---|
| Rosemary oil | 25 |
| Jasmin, synthetic | 50 |
| Benzoin R | 200 |
| Ethyl phthalate | 90 |
| | 1000 |

EXAMPLE VI

A lilac-type perfume having pleasant, apple blossom notes is prepared using a compound of this invention as an olfactory ingredient by combining the following components in the indicated proportions.

| Component: | Parts by wt. |
|---|---|
| Ethyl α-methyl α-(5-hydroxy-2,3,3a,4,5,6,7,7a-octahydro-4,7-methanoinden-5-yl) acetate | 10 |
| Terpineol | 15 |
| Vanillin | 1 |
| Musk ambrette | 1 |
| Ylang oil, Manila | 1 |
| Benzyl acetate | 2 |
| Linalool | 1 |
| Ionone | 1 |
| Couranga oil | 1 |
| Infusion ambrette seeds, 20 percent | 25 |
| Alcohol | 1000 |
| | 1058 |

I claim as my invention:

1. A compound selected from the group consisting of 3a,4,5,6,7,7a - hexahydro - 4,7 - methanoindene and 2,3,3a,4,5,6,7,7a - octahydro - 4,7 - methanoindene which is disubstituted in one of the 5 and 6 positions with the groups X—O— and

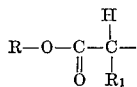

where X is selected from the group consisting of hydrogen and lower alkanoyl and R and $R_1$, independently, are selected from the group consisting of hydrogen, alkyl and alkenyl.

2. The compound according to claim 1 characterized in that it is 3a,4,5,6,7,7a-hexahydro-4,7-methanoindene disubstituted in one of the 5 and 6 positions.

3. The compound according to claim 1 characterized in that it is 2,3,3a,4,5,6,7,7a-octahydro-4,7-methanoindene disubstituted in the 5 position.

4. The compound according to claim 1 characterized in that X is hydrogen and R is alkyl or alkenyl.

5. The compound according to claim 1 characterized in that X is lower alkanoyl.

6. The compound according to claim 1 characterized in that R and $R_1$, when alkyl, contain from 1 to about 5 carbon atoms.

7. The compound according to claim 1 characterized in that R and $R_1$, when alkenyl, contain from 1 to about 5 carbon atoms.

8. The compound according to claim 1 characterized in that it is ethyl α-(5-hydroxy-2,3,3a,4,5,6,7,7a-octahydro-4,7-methanoinden-5-yl) acetate.

9. The compound according to claim 1 characterized in that it is ethyl α-methyl, α-(5-hydroxy-2,3,3a,4,5,6,7,7a-octahydro-4,7-methanoinden-5-yl) acetate.

10. The compound according to claim 1 characterized in that it is ethyl α-(5 or 6-hydroxy-3a,4,5,6,7,7a-hexahydro-4,7-methanoinden-5 or 6-yl) acetate.

11. The compound according to claim 1 characterized in that it is ethyl α-(5-acetyloxy-2,3,3a,4,5,6,7,7a-octahydro-4,7-methanoinden-5-yl) acetate.

References Cited

UNITED STATES PATENTS 3,270,061   8/1966   Chodroff et al. _____ 260—586

LORRAINE A. WEINBERGER, Primary Examiner

R. GERSTL, Assistant Examiner

U.S. Cl. X.R.

252—522; 260—488, 514